(12) United States Patent
Sasaki et al.

(10) Patent No.: US 7,497,790 B2
(45) Date of Patent: Mar. 3, 2009

(54) GOLF BALL

(75) Inventors: Takashi Sasaki, Kobe (JP); Akira Kato, Kobe (JP); Satoshi Iwami, Kobe (JP)

(73) Assignee: SRI Sports Limited, Kobe (JP)

( * ) Notice: Subject to any disclaimer, the term of this patent is extended or adjusted under 35 U.S.C. 154(b) by 0 days.

(21) Appl. No.: 09/987,469

(22) Filed: Nov. 14, 2001

(65) Prior Publication Data

US 2002/0091018 A1    Jul. 11, 2002

(30) Foreign Application Priority Data

Nov. 14, 2000   (JP)   ............................. 2000-346643

(51) Int. Cl.
*A63B 37/12* (2006.01)
(52) U.S. Cl. ..................................................... 473/378
(58) Field of Classification Search .................. 473/351, 473/378
See application file for complete search history.

(56) References Cited

U.S. PATENT DOCUMENTS

| 3,989,568 | A |   | 11/1976 | Isaac |   |
|---|---|---|---|---|---|
| 4,123,061 | A |   | 10/1978 | Dusbiber |   |
| 4,442,282 | A |   | 4/1984 | Kolycheck |   |
| 5,484,870 | A | * | 1/1996 | Wu | 528/28 |
| 5,929,189 | A |   | 7/1999 | Ichikawa et al. |   |
| 6,207,784 | B1 | * | 3/2001 | Rajagopalan | 528/71 |
| 6,251,991 | B1 |   | 6/2001 | Takesue et al. |   |
| 6,582,325 | B1 | * | 6/2003 | Ichikawa et al. | 473/378 |

OTHER PUBLICATIONS

Japanese Patent No. 9-271538 Corresponds To U.s. Patent No. 5,929,189.
Japanese Patent No. 11-128401 Corresponds To U.S. Patent No. 6,251,991.
Japanese Patent No. 11-128402 Corresponds To U.S. Patent No. 6,251,991.

* cited by examiner

*Primary Examiner*—Raeann Trimiew
(74) *Attorney, Agent, or Firm*—Birch, Stewart, Kolasch & Birch, LLP

(57) ABSTRACT

The present invention provides a golf ball having excellent shot feel, controllability, rebound characteristics, scuff resistance, yellowing resistance and productivity. The present invention relates to a golf ball comprising a core and a cover covering the core, wherein the cover comprises polyurethane-based thermoplastic elastomer formed by using cycloaliphatic diisocyanate as a base resin.

7 Claims, No Drawings

GOLF BALL

FIELD OF THE INVENTION

The present invention relates to a golf ball. More particularly, it relates to a golf ball having excellent shot feel, controllability, rebound characteristics, scuff resistance, yellowing resistance and productivity.

BACKGROUND OF THE INVENTION

Recently, ionomer resin has been widely used for cover material of golf balls. This is because the ionomer resin is superior in rebound characteristics, durability, productivity and the like. However, since the ionomer resin has high rigidity and hardness, there are problems that in the resulting golf ball, shot feel is hard and poor; and spin performance is not sufficiently obtained, which degrades controllability, when using ionomer resin as the cover material.

In order to improve the problems, it is attempted to soften the ionomer resin by various means. For example, it is proposed to blend the hard ionomer resin having high rigidity with terpolymer-based soft ionomer resin (Japanese Patent Kokai Publications No. 3931/1993, Japanese Patent No. 2709950 and the like) or blend the hard ionomer resin with thermoplastic elastomer (Japanese Patent Kokai Publications Nos. 299052/1994, 327794/1994 and the like) to soften the cover.

However, when good shot feel and spin performance are accomplished in case of the blend of the hard ionomer with the soft ionomer resin is used, rebound characteristics of the resulting golf ball are largely degraded. In addition, since the surface of the cover of the golf ball is easily abraded by grooves on a face surface of the golf club when hit by an iron club, it is problem that the surface of the golf ball becomes fluffy or begins to split finely, and scuff resistance is poor.

When the blend of the hard ionomer with the thermoplastic elastomer is used, rebound characteristics are excellent compared with the blend with the soft ionomer resin, but the compatibility between the both is poor, and scuff resistance when hit by an iron club is poor compared with the blend with the soft ionomer resin.

In order to solve the problems, it has been suggested to use thermosetting polyurethane composition (Japanese Patent Kokai publication Nos. 74726/1976, 241881/1992, U.S. Pat. No. 4,123,361 and the like), or polyurethane-based thermoplastic elastomer (U.S. Pat. Nos. 3,395,109, 4,248,432, Japanese Patent Kokai publication Nos. 271538/1997, 1280401/1999, 1280402/1999 and the like) as a cover material of golf ball. When the thermosetting polyurethane composition is used for the cover material, the scuff resistance, which is problem from using the blend of the hard ionomer resin with the soft ionomer resin or thermoplastic elastomer, is excellent. However, since a process of coating a cover on a core is complicated, large-scale production is difficult, and the productivity is degraded.

When the polyurethane-based thermoplastic elastomer is used for the cover material, compared with the thermosetting polyurethane composition, the productivity is improved, but shot feel, controllability and rebound characteristics of the resulting golf ball are not sufficiently obtained. When polyurethane-based thermoplastic elastomer formed by using typical diisocyanates, such as 2,4-tolylene diisocyanate, 2,6-tolylene diisocyanate or a mixture thereof (TDI), 4,4'-diphenylmethane diisocyanate (MDI) and the like, is used for the cover material, its strength is high, and scuff resistance of the resulting golf ball is excellent, but there is problem that yellowing is easy to occur, and it is required to further use white paint. In order to solve the problem, it is suggested to use polyurethane-based thermoplastic elastomer formed by using aliphatic diisocyanate for the cover material, there is problem that its strength is low, and scuff resistance of the resulting golf ball is degraded, compared with the polyurethane-based thermoplastic elastomer formed by using aromatic diisocyanate.

OBJECTS OF THE INVENTION

A main object of the present invention is to provide a golf ball having excellent shot feel, controllability, rebound characteristics, scuff resistance, yellowing resistance and productivity.

According to the present invention, the object described above has been accomplished by using polyurethane-based thermoplastic elastomer formed by using cycloaliphatic diisocyanate as a base resin of the cover, thereby providing a golf ball having excellent shot feel, controllability, rebound characteristics, scuff resistance, yellowing resistance and productivity.

SUMMARY OF THE INVENTION

The present invention relates to a golf ball comprising a core and a cover covering the core, wherein the cover comprises polyurethane-based thermoplastic elastomer formed by using cycloaliphatic diisocyanate as a base resin.

In order to put the present invention into a more suitable practical application, it is desired that the core be formed from rubber composition comprising cis-1,4-polybutadiene and have a deformation amount of 2.5 to 4.5 mm, when applying from an initial load of 98 N to a final load of 1275 N on the core, and the golf ball have a deformation amount of 2.4 to 4.0 mm, when applying from an initial load of 98 N to a final load of 1275 N on the golf ball; and the cycloaliphatic diisocyanate be at least one selected from the group consisting of 4,4'-dicyclohexylmethane diisocyanate, 1,3-bis(isocyanatomethyl)cyclohexane, isophorone diisocyanate, and trans-1,4-cyclohexane diisocyanate.

DETAILED DESCRIPTION OF THE INVENTION

In the detailed description of the present invention which follows, the golf ball of the present invention comprises a core and a cover formed on the core. The core may be the same one that has been conventionally used for solid golf ball, and may be obtained by mixing a rubber composition using a mixer such as a mixing roll, and then vulcanizing (crosslinking) or press-molding the rubber composition in a given mold into a spherical form. The rubber composition comprises 10 to 60 parts by weight of a vulcanizing agent (crosslinking agent), for example, α,β-unsaturated carboxylic acid (such as acrylic acid, methacrylic acid, etc.) or mono or divalent metal salts, such as zinc or magnesium salts thereof, or a functional monomer such as trimethylolpropane trimethacrylate, or a combination thereof;

0.5 to 5 parts by weight of co-crosslinking initiator such as organic peroxides;

10 to 30 parts by weight of filler such as zinc oxide, barium sulfate and the like; and optionally organic sulfide compound, antioxidant and the like, based on 100 parts by weight of a base rubber such as cis-1,4-polybutadiene. The vulcanization may be conducted, for example, by press molding in a mold at 130 to 240° C. and 2.9 to 11.8 MPa for 15 to 60 minutes. It is preferable for the surface of the resulting core to be buffed to improve the adhesion to the cover layer formed on the core. However, such core is given by way of illustrative examples only, and the invention shall not be limited thereto.

The core may have single-layered structure or multi-layered structure which has two or more layers. When the core has multi-layered structure, the inmost layer thereof is preferably formed from the rubber composition comprising cis-1,4-polybutadiene, but the other layer thereof may be formed from resins such as thermoplastic resin as a base resin.

In the golf ball of the present invention, it is desired for the core to have a deformation amount when applying from an initial load of 98 N to a final load of 1275 N of 2.5 to 4.5 mm, preferably 2.6 to 4.2 mm, more preferably 2.7 to 4.0 mm. When the deformation amount is smaller than 2.5 mm or larger than 4.5 mm, it is difficult to adjust a deformation amount of the resulting golf ball to a proper range, which degrades its shot feel or flight distance.

In the golf ball of the present invention, it is advantage in view of flight distance when hit by a driver or middle iron club for the core to have a hardness distribution such that the center point is the softest and the outer portion has higher hardness in order, and it is desired for the core to have a hardness difference in Shore D hardness between the center point and surface of not less than 10, preferably 15 to 45.

In the golf ball of the present invention, it is desired for the core to have the center hardness in Shore D hardness of 20 to 50, preferably 30 to 45. When the center hardness is lower than 20, it is difficult to adjust a deformation amount of the core to a proper range, and rebound characteristics of the resulting golf ball are degraded. On the other hand, when the center hardness is higher than 50, the hardness difference from the surface of the core is too small, which degrades its shot feel or flight distance of the resulting golf ball.

In the golf ball of the present invention, it is desired for the core to have the surface hardness in Shore D hardness of 45 to 72, preferably 50 to 68. When the hardness is lower than 45, it is difficult to adjust a deformation amount of the core to a proper range, and rebound characteristics of the resulting golf ball are degraded. On the other hand, when the hardness is higher than 72, the core is too hard, and the shot feel is hard and poor. The term "a surface hardness of the core" as used herein refers to the hardness, which is determined by measuring a hardness at the surface of the outmost layer in the whole core, whether the core has single-layered structure or multi-layered structure.

The cover is then covered on the core. In the golf ball of the present invention, it is required for the cover to comprise polyurethane-based thermoplastic elastomer formed by using cycloaliphatic diisocyanate as a base resin in view of yellowing resistance, scuff resistance and the like, preferably polyurethane-based thermoplastic elastomer formed by using diisocyanate having no double bond in backbone structure in molecule in view of weathering resistance. Polyurethane-based thermoplastic elastomer generally contains polyurethane structure as hard segment and polyester or polyether as soft segment. The polyurethane structure generally contains diisocyanate and curing agent, such as amine-based curing agent. In the golf ball of the present invention, the cover comprises as a base resin polyurethane-based thermoplastic elastomer that the diisocyanate is cycloaliphatic diisocyanate.

Examples of the cycloaliphatic diisocyanates include one or combination of two or more selected from the group consisting of 4,4'-dicyclohexylmethane diisocyanate ($H_{12}$MDI), which is hydrogenated compound of 4,4'-diphenylmethane diisocyanate (MDI); 1,3-bis(isocyanatomethyl)cyclohexane ($H_6$XDI), which is hydrogenated compound of xylylene diisocyanate (XDI); isophorone diisocyanate (IPDI); and trans-1,4-cyclohexane diisocyanate (CHDI). Preferred is the $H_{12}$MDI in view of general-purpose properties and processability.

Polyurethane-based thermoplastic elastomer formed by using cycloaliphatic diisocyanate, which is commercially available, can be used in the cover used in the golf ball of the present invention, and examples thereof include "Elastollan XNY90A", "Elastollan XNY97A", "Elastollan XNY585" (trade name) and the like, which are commercially available from BASF Polyurethane Elastomers Co., Ltd.

As the materials used in the cover of the present invention, the above polyurethane-based thermoplastic elastomer may be used alone, but the polyurethane-based thermoplastic elastomer may be used in combination with the other thermoplastic elastomer or ionomer resin. Examples of the other thermoplastic elastomers include the other polyurethane-based thermoplastic elastomer, polyester-based thermoplastic elastomer, polyamide-based thermoplastic elastomer, polystyrene-based thermoplastic elastomer, polyolefin-based thermoplastic elastomer and the like. The other thermoplastic elastomer may have function group, such as carboxyl group, glycidyl group, sulfone group, epoxy group and the like.

The amount of the thermoplastic elastomer or ionomer resin is 0 to 40 parts by weight, preferably 0 to 30 parts by weight, based on 100 parts by weight of the base resin for the cover. When the amount is larger than 40 parts by weight, either scuff resistance, rebound characteristics or yellowing resistance are degraded.

The cover composition used in the present invention may optionally contain pigments (such as titanium dioxide, etc.) and the other additives such as a dispersant, a plasticizer, an antioxidant, a UV absorber, a photostabilizer and a fluorescent agent or a fluorescent brightener, etc., in addition to the resin component as long as the addition of the additives does not deteriorate the desired performance of the golf ball cover.

A method of covering on the core with the cover is not specifically limited, but may be a conventional method. For example, there can be used a method comprising molding the cover composition into a semi-spherical half-shell in advance, covering the core with the two half-shells, followed by press molding at 130 to 170° C. for 1 to 5 minutes, or a method comprising injection molding the cover composition directly on the core, which is covered with the cover, to cover it.

In the golf ball of the present invention, it is desired for the cover to have a thickness of 0.5 to 2.0 mm, preferably 0.7 to 2.0 mm, more preferably 0.9 to 1.8 mm, most preferably 0.9 to 1.6 mm. When the thickness is smaller than 0.5 mm, the cover is too thin, and good shot feel and sufficient spin performance are not obtained, which reduces the flight distance. On the other hand, when the thickness is larger than 2.0 mm, the cover is too thick, and the spin amount when hit by a driver or middle iron club is not sufficiently obtained, which degrades the shot feel. In the cover of the present invention comprising polyurethane-based thermoplastic elastomer formed by using cycloaliphatic diisocyanate as a base resin, rebound characteristics are poor when compared with ionomer cover, but the golf ball having excellent rebound characteristics is accomplished by adjusting the thickness of the cover to relatively thin within the above range.

In golf ball of the present invention, it is desired for the cover to have a Shore D hardness of 30 to 55, preferably 33 to 52, more preferably 37 to 48. When the hardness is lower than 30, the spin amount when hit by a driver or middle iron club is high, which reduces the flight distance. On the other hand, when the hardness is higher than 55, the spin amount when hit by a short iron club is not sufficiently obtained, and also the shot feel is poor. The term "a hardness of the cover" as used herein refers to the hardness measured using a sample of a heat and press molded sheets from the cover composition.

At the time of molding the cover, many depressions called "dimples" may be optionally formed on the surface of the golf ball. Furthermore, paint finishing or marking with a stamp may be optionally provided after the cover molded for commercial purposes.

In the golf ball of the present invention, it is desired to have a deformation amount when applying from an initial load of 98 N to a final load of 1275 N of 2.4 to 4.0 mm, preferably 2.5 to 3.7 mm, more preferably 2.6 to 3.4 mm. When the deformation amount is smaller than 2.4 mm, the golf ball is too hard, and the shot feel is hard and poor. On the other hand, when the deformation amount is larger than 4.5 mm, the golf ball is too soft, and the shot feel is weak and poor, and also the flight distance is degraded.

The golf ball of the present invention is formed, so that it has a diameter of not less than 42.67 mm (preferably 42.67 to 43 mm) and a weight of not more than 45.93 g, in accordance with the regulations for golf balls.

EXAMPLES

The following Examples and Comparative Examples further illustrate the present invention in detail but are not to be construed to limit the scope of the present invention.

Production of Core (a) Cores A to E

The rubber composition for the core having the formulation shown in Table 1 was mixed, and then vulcanized by press-molding at 165° C. for 20 minutes in the mold to obtain spherical core. The weight, diameter and deformation amount of the resulting core were measured, and the results are shown in the same Table.

(b) Cores F and G (i) Production of Inner Core

The rubber composition for the inner core having the formulation shown in Table 1 was mixed, and then vulcanized by press-molding at 165° C. for 20 minutes in the mold to obtain spherical inner core. The weight, diameter and deformation amount of the resulting inner core were measured, and the results are shown in the same Table.

(ii) Production of Two-layer Structured Inner Core (Core F)

The rubber composition for the outer core having the formulation shown in Table 1 was mixed, and coated on the inner core produced in the step (i) into a concentric sphere, and then vulcanized by press-molding at 165° C. for 20 minutes in the mold to obtain two-layer structured core.

(Core G)

The composition for the outer core having the formulation shown in Table 1 was directly injection molded on the inner core produced in the step (i) to obtain two-layer structured core.

The weight, diameter and deformation amount of the resulting two-layer structured core were measured, and the results are shown in the same Table.

TABLE 1

| Core | A | B | C | D | E | F | G |
|---|---|---|---|---|---|---|---|
| (Inner core composition) | | | | | | | |
| BR-11 *1 | 100 | 100 | 100 | 100 | 100 | 100 | 100 |
| Zinc diacrylate | 30 | 32 | 32 | 34 | 32 | 33 | 31 |
| Zinc oxide | 9.9 | 9.1 | 16.5 | 8.3 | 8 | 8.5 | 21 |
| Dicumyl peroxide | 0.9 | 0.9 | 0.9 | 0.9 | 0.9 | 0.4 | 0.9 |
| Diphenyl disulfide | 0.5 | 0.5 | 0.5 | 0.5 | 0.5 | 0.5 | 0.5 |
| (Inner core) | | | | | | | |
| Weight (g) | — | — | — | — | — | 21.5 | 29.8 |
| Diameter (mm) | — | — | — | — | — | 33.5 | 36.4 |
| Deformation amount (mm) | — | — | — | — | — | 4.1 | 3.5 |
| (Outer core composition) | | | | | | | |
| BR-11 *1 | — | — | — | — | — | 100 | — |
| Zinc acrylate | — | — | — | — | — | 33 | — |
| Zinc oxide | — | — | — | — | — | 8.5 | — |
| Dicumyl peroxide | — | — | — | — | — | 0.5 | — |
| Diphenyl disulfide | — | — | — | — | — | 0.5 | — |
| Hi-milan 1605 *2 | — | — | — | — | — | — | 50 |
| Surlyn 9945 *3 | — | — | — | — | — | — | 50 |
| (Outer core) | | | | | | | |
| Weight (g) | 36.6 | 36.6 | 36.6 | 36.6 | 34.7 | 36.6 | 36.6 |
| Diameter (mm) | 39.8 | 39.8 | 39.8 | 39.8 | 39.2 | 39.8 | 39.8 |
| Deformation amount (mm) | 3.7 | 3.2 | 3.2 | 2.7 | 3.2 | 3.2 | 3.0 |

*1: High-cis polybutadiene commercially available from JSR Co., Ltd., under the trade name "BR-11" (Content of cis-1,4-polybutadiene = 96%)
*2: Hi-milan 1605 (trade name), ethylene-methacrylic acid copolymer ionomer resin obtained by neutralizing with sodium ion, manufactured by Du Pont-Mitsui Polychemicals Co., Ltd.
*3: Surlyn 9945 (trade name), ethylene-methacrylic acid copolymer ionomer resin obtained by neutralizing with zinc ion, manufactured by E. I. Du Pont Co.

Preparation of Cover Compositions

The formulation materials showed in Table 2 (Examples) and Table 3 (Comparative Examples) were mixed using a kneading type twin-screw extruder to obtain pelletized cover compositions. The extrusion condition was, a screw diameter of 45 mm, a screw speed of 200 rpm, a screw L/D of 35.

The formulation materials were heated at 200 to 260° C. at the die position of the extruder. The hardness were determined, using a sample of a stack of the three or more heat and press molded sheets having a thickness of about 2 mm from the cover composition, which had been stored at 23° C. for 2 weeks, with a Shore D hardness meter according to ASTM D 2240-68. The results are shown as a cover hardness in Tables 2 to 5.

TABLE 2

| Cover composition | Example No. | | | | | | | |
|---|---|---|---|---|---|---|---|---|
| | 1 | 2 | 3 | 4 | 5 | 6 | 7 | 8 |
| Elastollan XNY90A *4 | 100 | — | 75 | 100 | 100 | — | 100 | 100 |
| Elastollan XNY97A *5 | — | 100 | — | — | — | 100 | — | — |
| Elastollan ET890 *6 | — | — | 25 | — | — | — | — | — |

TABLE 2-continued

| Cover | Example No. (parts by weight) | | | | | | | |
|---|---|---|---|---|---|---|---|---|
| composition | 1 | 2 | 3 | 4 | 5 | 6 | 7 | 8 |
| Pandex T-7890 *7 | — | — | — | — | — | — | — | — |
| Surlyn 8945 *8 | — | — | — | — | — | — | — | — |
| Hi-milan AM7316 *9 | — | — | — | — | — | — | — | — |
| Titanium dioxide | 4 | 4 | 4 | 4 | 4 | 4 | 4 | 4 |

TABLE 3

| Cover composition | | Comparative Example No. (parts by weight) | | | |
|---|---|---|---|---|---|
| | | 1 | 2 | 3 | 4 |
| Elastollan XNY90A | *4 | — | — | — | — |
| Elastollan XNY97A | *5 | — | — | — | — |
| Elastollan ET890 | *6 | 100 | — | — | — |
| Pandex T-7890 | *7 | — | 100 | — | — |
| Surlyn 8945 | *8 | — | — | 50 | 30 |
| Hi-milan AM7316 | *9 | — | — | 50 | 70 |
| Titanium dioxide | | 4 | 4 | 4 | 4 |

*4: Elastollan XNY90A (trade name), polyurethane-based thermoplastic elastomer formed by using 4,4'-dicyclohexylmethane diisocyanate ($H_{12}MDI$) (= hydrogenated MDI), commercially available from BASF Polyurethane Elastomers Co., Ltd.
*5: Elastollan XNY97A (trade name), polyurethane-based thermoplastic elastomer formed by using 4,4'-dicyclohexylmethane diisocyanate ($H_{12}MDI$) (= hydrogenated MDI), commercially available from BASF Polyurethane Elastomers Co., Ltd.
*6: Elastollan ET890 (trade name), polyurethane-based thermoplastic elastomer formed by using 4,4'-diphenylmethane diisocyanate (MDI), commercially available from BASF Polyurethane Elastomers Co., Ltd.
*7: Pandex T-7890 (trade name), polyurethane-based thermoplastic elastomer formed by using hexamethylene diisocyanate (HDI), commercially available from Dainippon Ink & Chemicals Inc.
*8: Surlyn 8945 (trade name), ethylene-methacrylic acid copolymer ionomer resin obtained by neutralizing with sodium ion, manufactured by Du Pont Co.
*9: Hi-milan AM7316 (trade name), ethylene-methacrylic acid-alkyl acrylate terpolymer ionomer resin obtained by neutralizing with zinc ion, manufactured by Du Pont-Mitsui Polychemicals Co., Ltd.

Examples 1 to 8 and Comparative Examples 1 to 4

The cover composition was covered on the core obtained as described above by injection molding to form a cover layer having the thickness shown in Table 4 (Examples) and Table 5 (Comparative Examples). Then, paint was coated on the surface of the cover layer to obtain a golf ball having a diameter of 42.8 mm and a weight of 45.3 g. With respect to the resulting golf balls, the deformation amount, coefficient of restitution, flight distance, shot feel, controllability, yellowing resistance and scuff resistance were measured or evaluated. The results are shown in Table 4 (Examples) and Table 5 (Comparative Examples). The test methods are as follows.

(Test Method)

(1) Deformation Amount

The deformation amount is determined by measuring a deformation amount, when applying from an initial load of 98 N to a final load of 1275 N on the golf ball.

(2) Coefficient of Restitution

An aluminum cylinder having a weight of 200 g was struck at a speed of 45 m/sec against a golf ball, and the velocity of the cylinder and the golf ball after the strike were measured. The coefficient of restitution of the golf ball was calculated from the velocity and the weight of both the cylinder and the golf ball. The measurement was conducted 5 times for each golf ball, and the average is shown as the coefficient of restitution of the golf ball (3) Flight Performance A No. 1 wood club (W#1, a driver) having metal head was mounted to a swing robot manufactured by True Temper Co. and the resulting golf ball was hit at a head speed of 45 m/second, the flight distance were measured. As the flight distance, total that is a distance to the stop point of the hit golf ball was measured. The measurement was conducted 12 times for each golf ball (n=5), and the average is shown as the result of the golf ball.

(4) Shot Feel

The shot feel of the golf ball is evaluated by 10 golfers according to a practical hitting test using a No. 1 wood club (W#1, a driver) having a metal head. The evaluation criteria are as follows. The results shown in the Tables below are based on the fact that the most golfers evaluated with the same criterion about shot feel.

Evaluation Criteria

○: The golfers felt that the golf ball has good shot feel such that impact force at the time of hitting is small and rebound characteristics are good.

Δ: The golfers felt that the golf ball has fairly good shot feel.

x : The golfers felt that the golf ball has poor shot feel such that impact force at the time of hitting is large or the golf ball has heavy and poor shot feel.

(5) Controllability

The controllability of the golf ball is evaluated by 10 golfers according to a practical hitting test using a pitting wedge (PW). The evaluation criteria are as follows. The results shown in the Tables below are based on the fact that the most golfers evaluated with the same criterion about controllability.

Evaluation Criteria

○: The golfers felt that it is easy to apply spin on the golf ball, and the golf ball has good controllability.

Δ: The golfers felt that the golf ball has fairly good controllability.

x: The golfers felt that it is difficult to apply spin on the golf ball such that the golf ball slips on the face of golf club, and the golf ball has poor controllability.

(6) Yellowing Resistance

The resulting golf ball was expose to a sunshine weather meter manufactured by Suga Test Instruments Co., Ltd. for 120 hours. The color difference (ΔL, Δa and Δb) of the surface of the golf ball between before and after the exposure was measured by using a color-difference-colorimeter, which is commercially available from Minolta Co., Ltd. under the trade name "CR-221", and was represented by ΔE. The ΔE is determined by using the following formula:

$$\Delta E = [(\Delta L)^2 + (\Delta a)^2 + (\Delta b)^2]^{1/2}$$

The larger the value of color difference ΔE is, the less the yellowing resistance is.

(7) Scuff Resistance

After a pitching wedge commercially available was mounted to a swing robot manufactured by True Temper Co., two points on the surface of each golf ball was hit at a head speed of 36 m/sec one time for each point. The two points were evaluated by checking the surface appearance by visual observation. The evaluation criteria are as follows.

Evaluation Criteria

○: The surface of the golf ball slightly has a cut, but it is not particularly noticeable.

Δ: The surface of the golf ball clearly has a cut, and the surface becomes fluffy.

x: The surface of the golf ball is considerably chipped off, and the surface noticeably becomes fluffy.

(Test Results)

TABLE 4

| | Example No. | | | | | |
|---|---|---|---|---|---|---|
| Test item | 1 | 2 | 3 | 4 | 5 | 6 |
| (Core) | | | | | | |
| Core | B | B | B | A | D | E |
| Weight (g) | 36.6 | 36.6 | 36.6 | 36.6 | 36.6 | 34.7 |
| Diameter (mm) | 39.8 | 39.8 | 39.8 | 39.8 | 39.8 | 39.2 |
| Deformation amount (mm) | 3.2 | 3.2 | 3.2 | 3.7 | 2.7 | 3.2 |
| (Cover) | | | | | | |
| Thickness (mm) | 1.5 | 1.5 | 1.5 | 1.5 | 1.5 | 1.8 |
| Shore D hardness | 41 | 52 | 41 | 41 | 41 | 52 |
| (Golf ball) | | | | | | |
| Deformation amount (mm) | 3.08 | 2.95 | 3.10 | 3.55 | 2.63 | 2.93 |
| Coefficient of restitution | 0.760 | 0.764 | 0.761 | 0.755 | 0.768 | 0.756 |
| Flight distance (m) | 210 | 211 | 210 | 208 | 213 | 208 |
| Shot feel | ○ | ○ | ○ | ○ | ○ | ○ |
| Controllability | ○ | ○ | ○ | ○ | ○ | ○ |
| Yellowing resistance (ΔE) | 1.9 | 1.8 | 2.7 | 1.8 | 1.8 | 1.8 |
| Scuff resistance | ○ | ○ | ○ | ○ | ○ | ○ |

TABLE 5

| | Example No. | | Comparative Example No. | | | |
|---|---|---|---|---|---|---|
| Test item | 7 | 8 | 1 | 2 | 3 | 4 |
| (Core) | | | | | | |
| Core | F | G | B | B | C | C |
| Weight (g) | 36.6 | 36.6 | 36.6 | 36.6 | 36.6 | 36.6 |
| Diameter (mm) | 39.8 | 39.8 | 39.8 | 39.8 | 39.8 | 39.8 |
| Deformation amount (mm) | 3.2 | 3.0 | 3.2 | 3.2 | 3.2 | 3.2 |
| (Cover) | | | | | | |
| Thickness (mm) | 1.5 | 1.5 | 1.5 | 1.5 | 1.5 | 1.8 |
| Shore D hardness | 41 | 41 | 40 | 41 | 50 | 45 |
| (Golf ball) | | | | | | |
| Deformation amount (mm) | 3.07 | 3.02 | 3.10 | 3.04 | 2.95 | 3.01 |
| Coefficient of restitution | 0.761 | 0.759 | 0.760 | 0.750 | 0.749 | 0.744 |
| Flight distance (m) | 210 | 209 | 210 | 207 | 203 | 201 |
| Shot feel | ○ | ○ | ○ | ○ | ○ | ○ |
| Controllability | ○ | ○ | ○ | ○ | Δ | ○ |
| Yellowing resistance (ΔE) | 1.8 | 1.8 | 10.4 | 1.8 | 2.5 | 2.6 |
| Scuff resistance | ○ | ○ | ○ | Δ | Δ | x |

As is apparent from the results of Tables 4 and 5, the golf balls of the present invention of Examples 1 to 8, when compared with the golf balls of Comparative Examples 1 to 4, are superior in rebound characteristics, shot feel, controllability, yellowing resistance and scuff resistance.

On the other hand, in the golf balls of Comparative Example 1, the polyurethane-based thermoplastic elastomer formed by using aromatic diisocyanate is used for the cover, and the scuff resistance is excellent, but the yellowing is very easy to occur.

In the golf ball of Comparative Example 2, the polyurethane-based thermoplastic elastomer formed by using aliphatic diisocyanate is used for the cover, and the yellowing is very difficult to occur, but the scuff resistance is excellent.

In the golf balls of Comparative Examples 3 and 4, the blend of hard ionomer resin with soft ionomer resin is used for the cover, and the coefficient of restitution is small and the scuff resistance is degraded when the golf ball is adjusted such that it has to good shot feel and controllability.

What is claimed is:

1. A golf ball comprising
   a core and
   a cover covering the core,
   wherein the core is formed from a rubber composition comprising cis-1,4-polybutadiene and
   the cover, having a thickness of 0.5 to 1.5 mm and a hardness in Shore D of 33 to 52, comprises polyurethane-based thermoplastic elastomer formed by using non-ionic cycloaliphatic diisocyanate in the backbone structure of the polyurethane molecule as a base resin selected from the group consisting of 4,4'-dicyclohexylmethane diisocyanate, 1,3-bis (isocyanatomethyl)cyclohexane, isophorone diisocyanate, and trans-1,4cyclohexane diisocyanate;
   and the core has a deformation amount of 2.5 to 4.5 mm, when applying from an initial load of 98 N to a final load of 1275 N on the core, and
   the golf ball has a deformation amount of 2.4 to 4.0 mm, when applying from an initial load of 98 N to a final load of 1275 N on the golf ball.

2. The golf ball of claim 1, wherein the core deformation amount is 2.6 to 4.2 mm.

3. The golf ball of claim 1, wherein the core deformation amount is 2.7 to 4.0 mm.

4. The golf ball of claim 1, wherein the thermoplastic elastomer is formed by using 4,4'-dicyclohexylmethane diisocyanate.

5. The golf ball of claim 1, wherein the cover further comprises another thermoplastic elastomer or ionomer resin in an amount of 0 to 40 parts by weight based on 100 parts by weight of the whole resin for the cover.

6. The golf ball of claim 1, wherein the deformation amount for the golf ball is 2.5 to 3.7 mm.

7. The golf ball of claim 1, wherein the deformation amount for the golf ball is 2.6 to 3.4 mm.

* * * * *